(No Model.)
E. F. ROBBINS.
PULLEY BLOCK.
No. 328,340. Patented Oct. 13, 1885.
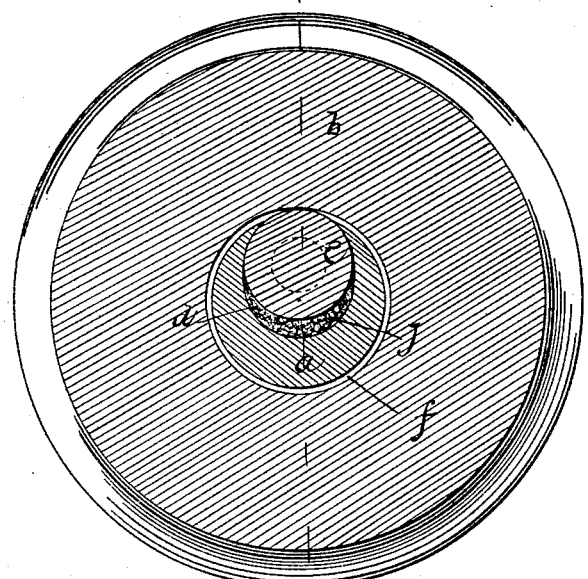
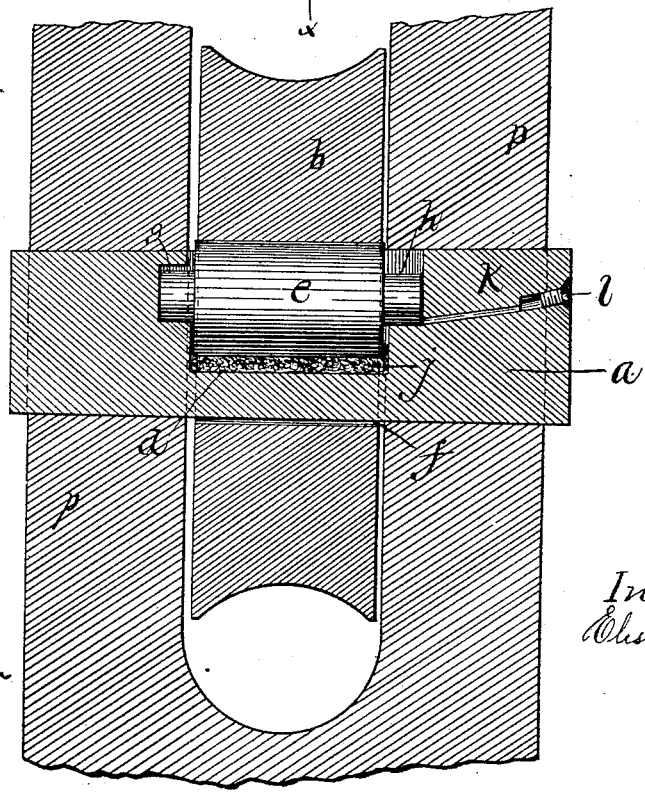
Witnesses:
H. Brown.
H. M. Batchelder
Inventor:
Elisha F. Robbins

UNITED STATES PATENT OFFICE.

ELISHA F. ROBBINS, OF COTUIT, MASSACHUSETTS.

PULLEY-BLOCK.

SPECIFICATION forming part of Letters Patent No. 328,340, dated October 13, 1885.

Application filed August 12, 1885. Serial No. 174,217. (No model.)

*To all whom it may concern:*

Be it known that I, ELISHA F. ROBBINS, of Cotuit, in the county of Barnstable and State of Massachusetts, have invented certain new and useful Improvements in Pulley-Blocks; of which the following is a specification.

This invention has for its object to provide a bearing for the sheave of blocks, pulleys, &c., adapted to admit of the rotation of the sheave with the minimum of friction; and it consists in a stationary pin passing through the pulley and secured to the cheeks of a pulley-block, and preferably made of tapering form to admit of easy removal, a recess formed in said pin, and a roller placed in said recess and forming the support of the sheave, and on which said sheave is adapted to rotate.

The invention also consists in the means supplied for lubricating said roller, all of which I will now proceed to describe.

Of the accompanying drawings forming a part of this specification, Figure 1 represents a sectional view of a pulley sheave, pin, and roller embodying my invention. Fig. 2 represents a section on line $x\,x$, Fig. 1.

The same letters of reference indicate the same parts in both the figures.

In carrying out my invention, I provide a pin, $a$, adapted to pass through the sheave $b$ and cheeks of a pulley-block, $p$. Said pin may be of tapering form or may be straight, and is preferably squared at $c$, so that it may fit a square socket in the block or strap of the same, by which it is prevented from rotating. In the upper side of said pin is a recess, $d$, of suitable form to receive a roller, $e$, said roller being journaled at each end in bearings $g\,h$ formed in the pin $a$. The roller $e$ projects above the surface of the pin sufficiently to permit the sheave to rest on said roller without coming in contact with the pin, so that the sheave can be rotated over the roller and around the pin with the minimum of friction. The hole $f$ in the sheave is of sufficient diameter to admit of the rotation of the sheave without rubbing against the pin at any point.

The recess $d$ in the pin is of sufficient depth to receive a lubricating-packing $j$—such as waste, sponge, or any suitable packing—the packing being supplied with oil through a passage, $k$, in the outer end of which is inserted a screw-plug, $l$, or other suitable removable cover. Oil being introduced into said passage saturates the packing, and the rotation of the roller carries the oil to all parts of the same, thus serving to keep said roll constantly lubricated, and thereby effecting a great reduction in the wear of the bearing-surfaces. If desired, a separate oil passage may be used for each end of the roller.

It will be seen that by my improved device the wear of the bearing-surfaces of the sheave and pin is greatly reduced. The advantage of my improvement over the construction wherein the sheave is rotated in rubbing contact with the periphery of the pin will be readily appreciated. In the present case the pin is not subject to wear, as in the former, but the roller taking all the weight imposed upon the sheave, and rotating with it, the sheave is not subjected to wear from friction, as has heretofore been the case. Moreover, the means of lubricating the bearings of the roller and the face of the roller itself counteracts wear and increases the durability of my device.

The pin and roller can be used interchangeably, and spare pins and rollers can be kept on hand, as on shipboard, to replace any when sufficiently worn.

I do not limit myself to the use of one roller, as shown, for the purpose of supporting the sheave. Two or more rollers may be used without departing from the spirit of my invention.

The opening $h$ in the pin $a$ is so constructed that the roller may be easily removed when necessary. By removing the pin from the block and inverting the same, the roller may be readily withdrawn and another substituted.

Should it be considered unnecessary to lubricate the face of the roller, the packing in the bottom of the recess may be dispensed with, and the oil-passages may be used through both ends of the pin, so that the journals of the roller only may be oiled.

I claim—

1. The combination of a fixed pin or support having a recess in its periphery, a roller journaled in said recess and having a portion of its periphery projecting outside of the pin, and a wheel or pulley having a central opening larger than the pin, the margin of said opening resting on the roller, as set forth.

2. A pulley-block having a fixed recessed pin and a roller journaled in the recess of said pin as a rolling support for the pulley, as set forth.

3. The combination, with the recessed pin or support of a block or pulley sheave, of the roller adapted to be placed in the recess of the pin or support, and formed to rotate with the sheave, as set forth.

4. The combination of the pin or support having the recess $d$, and the oil-passage communicating with said recess, the roller placed in said recess so as to come in contact with the oil supplied thereto, and the pulley supported by the projecting portion of said roller, as set forth.

In testimony whereof I have signed my name to this specification, in the presence of two subscribing witnesses, this 7th day of August, 1885.

ELISHA F. ROBBINS.

Witnesses:
C. F. BROWN,
H. BROWN.